(12) United States Patent
Barkley et al.

(10) Patent No.: US 10,255,014 B2
(45) Date of Patent: Apr. 9, 2019

(54) APPARATUS AND METHOD FOR SHARING INK DOT COUNT INFORMATION BETWEEN INKJET PRINTERS CONNECTED TO A NETWORK

(71) Applicant: FUNAI ELECTRIC CO., LTD, Osaka (JP)

(72) Inventors: Lucas Barkley, Lexington, KY (US); Bruce Deboard, Lexington, KY (US); Brian Jones, Lexington, KY (US)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 16/124,783

(22) Filed: Sep. 7, 2018

(65) Prior Publication Data

US 2019/0018634 A1 Jan. 17, 2019

Related U.S. Application Data

(63) Continuation of application No. 15/650,001, filed on Jul. 14, 2017, now Pat. No. 10,108,384.

(51) Int. Cl.
*G06F 3/12* (2006.01)

(52) U.S. Cl.
CPC .......... *G06F 3/1296* (2013.01); *G06F 3/1205* (2013.01); *G06F 3/1219* (2013.01); *H04N 2201/0003* (2013.01)

(58) Field of Classification Search
CPC .... G06F 3/1296; G06F 3/1219; G06F 3/1205; H04N 2201/0003
See application file for complete search history.

(56) References Cited

U.S. PATENT DOCUMENTS

| | | | |
|---|---|---|---|
| 9,498,972 B2 | 11/2016 | Ejiri et al. | |
| 2002/0135624 A1 | 9/2002 | Naka et al. | |
| 2004/0101320 A1 | 5/2004 | Haramoto | |
| 2004/0220779 A1* | 11/2004 | Fukao | G06F 3/1204 702/188 |
| 2007/0097161 A1* | 5/2007 | Ejiri | B41J 2/17546 347/5 |
| 2009/0295849 A1* | 12/2009 | Ito | B41J 2/17566 347/7 |
| 2013/0314461 A1 | 11/2013 | Ejiri et al. | |

* cited by examiner

*Primary Examiner* — Frantz Bataille
(74) *Attorney, Agent, or Firm* — Luedeka Neely Group, PC

(57) ABSTRACT

A system tracks the exact amount of ink remaining in printhead cartridges used in printers connected to a network. Each printer stores a history of cartridges that have been used in the printer. Each cartridge stores a status indicator that indicates whether the cartridge has been used before in any printer. When a printer receives a previously-used cartridge, the printer broadcasts a request for information about that cartridge from the other printers. Each printer having the matching printhead identification number in its history reports over the network the last recorded ink dot count associated with the matching printhead identification number. The requesting printer chooses the most up-to-date response based on the highest dot count or the latest timestamp. The requesting printer then updates its memory using the dot count from the most up-to-date response and begins counting dots from that updated count for subsequent print jobs performed using the installed cartridge.

8 Claims, 3 Drawing Sheets

| Printer 2 Memory | | |
|---|---|---|
| Printhead ID Value | Ink Dot Count Value | Timestamp Value |
| 00001 | 12345 | Wed Apr 26 02:16:57 2017 |
| 00002 | 67890 | Tue Apr 25 12:06:37 2017 |
| 00003 | 00010 | Mon Apr 24 10:13:42 2017 |

*FIG. 3A*

| Printer 3 Memory | | |
|---|---|---|
| Printhead ID Value | Ink Dot Count Value | Timestamp Value |
| 00001 | 30103 | Fri Apr 28 10:46:26 2017 |
| 00004 | 38460 | Tue Apr 25 12:06:37 2017 |
| 00005 | 31526 | Mon Apr 24 10:13:42 2017 |

*FIG. 3B*

APPARATUS AND METHOD FOR SHARING INK DOT COUNT INFORMATION BETWEEN INKJET PRINTERS CONNECTED TO A NETWORK

RELATED APPLICATION

This application is a continuation of application Ser. No. 15/650,001, filed Jul. 14, 2017, now allowed.

FIELD

This invention relates to the field of inkjet printers and printhead cartridges. More particularly, this invention relates to a system for advertising ink dot count values over a network when a printhead cartridge is moved from one printer to another.

BACKGROUND

Nonvolatile memory in disposable inkjet printhead cartridges is typically very small to keep manufacturing costs down. Re-writable nonvolatile memory is more expensive than one-time programmable memory. Because of these constraints, disposable inkjet printheads provide only a course indication of ink remaining due to a small number of ink levels encoded in the printhead's limited nonvolatile memory. When a printhead is moved from one printer to another, it carries only this very coarse ink level indication with it. The new printer must make an assumption about where the actual ink level is between the coarse levels that are reported by the printhead nonvolatile memory. In applications such as business accounting, this is unacceptable because accurate dot counting is important.

What is needed, therefore, is a way to more precisely keep track of the remaining ink level in an inkjet printhead cartridge as the cartridge moves from one printer to another.

SUMMARY

The system described herein solves the problem of determining the exact amount of ink remaining in printhead cartridges used in printers that are all connected to the same network and that can communicate with each other. Each printer keeps a history of printhead cartridges that have been used in the printer. Each printhead cartridge stores in its memory a status indicator value that indicates whether the cartridge has ever been used before in any printer.

When a printer receives a printhead cartridge that has been previously used, the printer broadcasts a request on the network that in effect says, "I have a used printhead installed having serial number X. Any printer that has information about this printhead, please report to me." Each printer on the network having the matching printhead serial number in their history then reports over the network the last recorded ink dot count associated with the matching printhead serial number. The requesting printer chooses the most up-to-date response based either on the highest dot count or the latest time-stamp, if available. The requesting printer then updates its memory using the dot count from the most up-to-date response and begins counting dots from that updated count for subsequent print jobs performed using the installed printhead. Based on a known total available ink dot count for a particular cartridge ink reservoir size, the printer can precisely determine the amount of ink remaining in the cartridge.

Accordingly, preferred embodiments provide a system in which inkjet printers are not solely dependent on a course ink indication level carried in the memory of the inkjet printhead cartridges to estimate an amount of ink remaining.

Preferred embodiments also provide a system in which inkjet printers connected to a network work together to determine the most accurate ink level information for printhead cartridges installed in the printers.

In one aspect, the invention provides a method for precisely determining an amount of ink that has been expended by an inkjet printhead cartridge that is installed in an inkjet printer connected to a network to which other inkjet printers are connected. One preferred embodiment of the method includes the following steps:

(a) prior to using the inkjet printhead cartridge for a first time after installation in a first printer, the first printer accessing a printhead identification value stored in a printhead memory device in the inkjet printhead cartridge, where the printhead identification value uniquely identifies the inkjet printhead cartridge;

(b) the first printer generating a request that includes the printhead identification value and seeks information from other of the inkjet printers connected to the network regarding the inkjet printhead cartridge installed in the first printer;

(c) broadcasting the request over the network to the other inkjet printers;

(d) the other inkjet printers receiving the request and each of the other inkjet printers accessing its printer memory device to determine whether the printhead identification value is stored therein;

(e) one or more responding printers each accessing its printer memory device to determine an ink dot count value associated with the printhead identification value, wherein the responding printers are other inkjet printers that determine the printhead identification value is stored in their memory devices;

(f) the responding printers generating responses that each include the ink dot count value associated with the printhead identification value;

(g) broadcasting the responses generated in step (f) over the network;

(h) the first printer receiving the responses that were broadcast over the network;

(i) the first printer choosing one of the responses based on a highest ink dot count value contained in the responses;

(j) the first printer storing in its printer memory device the ink dot count value from the response chosen in step (i); and (k) as printing is performed using the inkjet printhead cartridge installed in the first printer, incrementing the ink dot count value stored in the printer memory device of the first printer based on a number of ink dots ejected from the inkjet printhead cartridge after installation in the first printer.

In some embodiments, the method includes:

(l) prior to using the inkjet printhead cartridge for the first time after installation in the first printer, the first printer accessing a status indicator value stored in the printhead memory device in the inkjet printhead cartridge, wherein the status indicator value indicates a used status or a not-used status of the inkjet printhead cartridge; and (m) based on the status indicator value, the first printer determining whether the inkjet printhead cartridge has been used or has not been used prior to installation in the first printer.

Some embodiments include determining a remaining ink level value for the inkjet printhead cartridge based on the ink dot count value stored in the printer memory device of the first printer.

In some embodiments, at least steps (a), (b), (i), (j), (k), (l), and (m) are performed by a processor in the first printer. In some embodiments, at least steps (d), (e) and (f) are performed by one or more processors in one or more of the other inkjet printers.

In some embodiments, step (j) includes the first printer storing in its memory device the ink dot count value from the chosen response in association with the printhead identification value.

In some embodiments, step (i) includes choosing a response having the highest ink dot count value which is determined by comparing a first ink dot value contained in a first response to a second ink dot count value contained in a second response.

In another aspect, the invention provides an apparatus for precisely determining an amount of ink that has been expended by an inkjet printhead cartridge that is installed in an inkjet printer connected to a network to which other inkjet printers are connected. In a preferred embodiment, the system includes first, second, and third inkjet printers connected to a network, and an inkjet printer cartridge installed in the first inkjet printer. The inkjet printhead cartridge includes a printhead memory device in which is stored a first printhead identification value that uniquely identifies the inkjet printhead cartridge.

The first inkjet printer includes a first memory device for storing a first ink dot count value, a first processor, and a first network interface. Prior to using the inkjet printhead cartridge for the first time after installation in the first inkjet printer, the first processor accesses the first printhead identification value stored in the printhead memory device of the inkjet printhead cartridge and generates a request that includes the first printhead identification value. The request seeks information from the other inkjet printers connected to the network regarding the inkjet printhead cartridge installed in the first ink jet printer. The first network interface broadcasts the request over the network to the other inkjet printers.

The second inkjet printer includes a second memory device, a second network interface, and a second processor. The second memory device stores one or more printhead identification values in association with one or more ink dot count values. The second network interface receives the request that was broadcast over the network from the first inkjet printer. The second processor executes instructions to access the second printer memory device to determine whether any of the printhead identification values stored therein matches the first printhead identification value included in the request. If any of the printhead identification values stored in the second printer memory device matches the first printhead identification value, the second processor accesses the second printer memory device to determine an ink dot count value associated with the printhead identification value that matches the first printhead identification value and generates a first response that includes the determined ink dot count value. The second network interface then broadcasts the first response over the network from the second inkjet printer.

The third inkjet printer includes a third memory device, a third network interface, and a third processor. The third memory device also stores one or more printhead identification values in association with one or more ink dot count values. The third network interface receives the request that was broadcast over the network from the first inkjet printer. The third processor executes instructions to access the third printer memory device to determine whether any of the printhead identification values stored therein matches the first printhead identification value included in the request. If any of the printhead identification values stored in the third printer memory device matches the first printhead identification value, the third processor accesses the third printer memory device to determine an ink dot count value associated with the printhead identification value that matches the first printhead identification value and generates a second response that includes the determined ink dot count value. The third network interface then broadcasts the second response over the network from the third inkjet printer, and the first network interface receives the first and second responses that were broadcast over the network.

Based on comparing the ink dot value contained in the first response to the ink dot count value contained in the second response, the first processor determines a highest ink dot count value and stores the highest ink dot count value as the first ink dot count value in the first printer memory device. As printing is performed using the inkjet printhead cartridge installed in the first inkjet printer, the first processor increments the first ink dot count value stored in the first printer memory device based on a number of ink dots ejected from the inkjet printhead cartridge after installation in the first inkjet printer.

In yet another aspect, the invention provides a method for sharing ink dot count information between inkjet printers connected to a network. In a preferred embodiment, the method includes the following steps:

(a) a first inkjet printer broadcasting a request that includes a printhead identification value that identifies an inkjet printhead cartridge installed in the first inkjet printer;

(b) a second inkjet printer receiving the request that was broadcast over the network from the first inkjet printer;

(c) the second inkjet printer accessing a second printer memory device in the second inkjet printer to determine whether a printhead identification value is stored therein that matches the printhead identification value included in the request;

(d) if a printhead identification value is stored in the second printer memory device that matches the printhead identification value included in the request, the second inkjet printer accessing the second printer memory device to determine an ink dot count value associated with the printhead identification value;

(e) the second inkjet printer generating a response that includes the ink dot count value associated with the printhead identification value; and (f) the second inkjet printer broadcasting the response over the network.

In some embodiments, the method also includes the following steps:

(g) the first inkjet printer receiving the response from the second inkjet printer and other responses that were broadcast over the network from other inkjet printers connected to the network;

(h) the first inkjet printer choosing one of the responses from the second inkjet printer and the other inkjet printers based on a highest ink dot count value contained in the responses from the second inkjet printer and the other inkjet printers;

(i) the first inkjet printer storing the ink dot count value contained in the chosen response in a first printer memory device in the first inkjet printer; and (j) as printing is performed using the inkjet printhead cartridge installed in the first inkjet printer, incrementing the ink dot count value stored in the first printer memory device based on a number of ink dots ejected from the inkjet printhead cartridge after installation in the second inkjet printer.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIGS. 3A and 3B are exemplary tabular representations of ink dot count values stored in printer memory in association printhead identification values for two different printhead cartridges.

DETAILED DESCRIPTION

Figure 1:
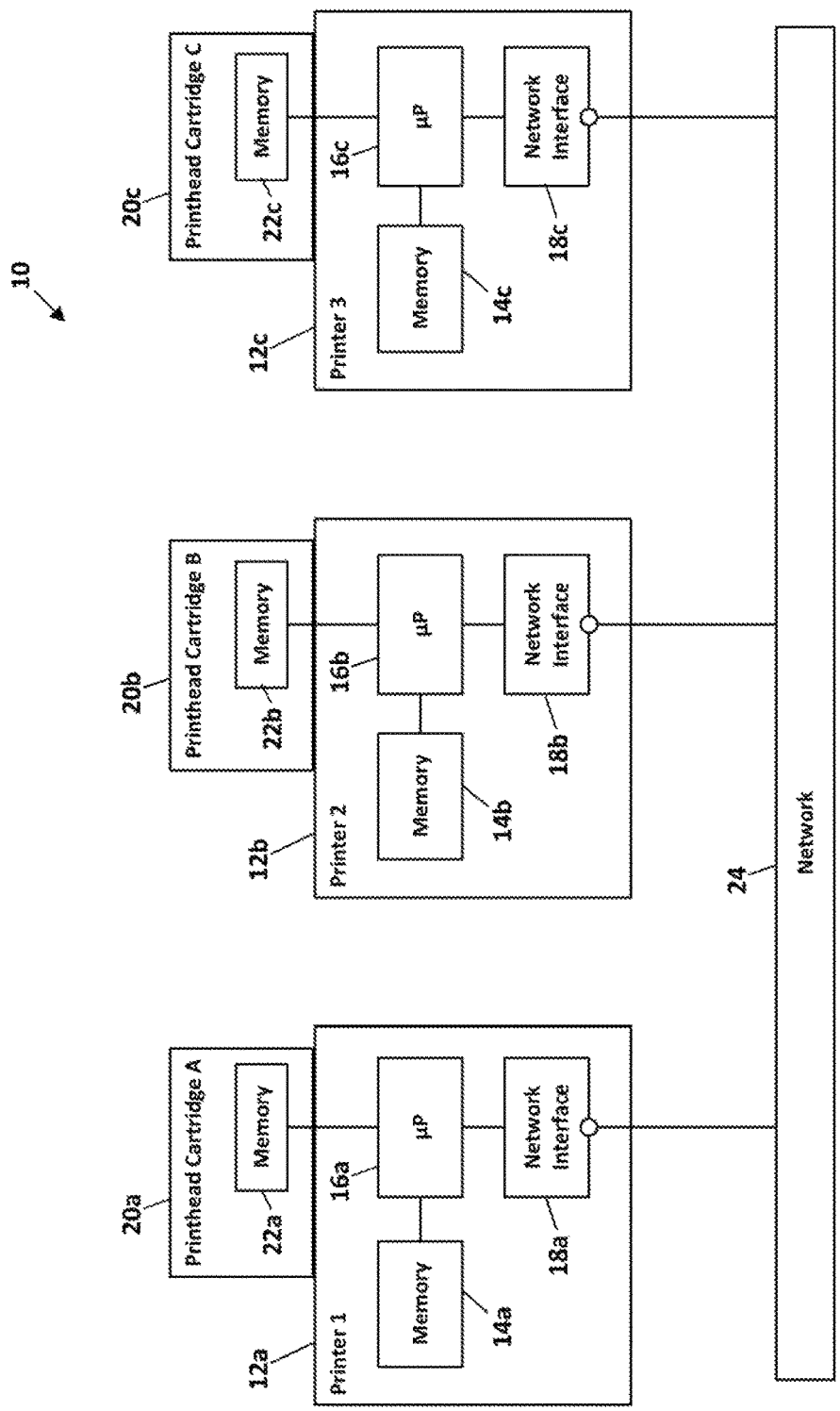
FIG. 1 depicts multiple inkjet printers connected to a network according to a preferred embodiment.

As shown in FIG. 1, an inkjet printer system 10 includes multiple inkjet printers 12a, 12b, 12c connected to a network 24, such as an Ethernet network. Each of the printers 12a, 12b, 12c includes a nonvolatile memory device 14a, 14b, 14c, a processor 16a, 16b, 16c, and a network interface 18a, 18b, 18c. The network interfaces 18a, 18b, 18c enable communications between each of the printers 12a, 12b, 12c via the network 24. Installed in each printer 12a, 12b, 12c is a printhead cartridge 20a, 20b, 20c. Each printhead cartridge 20a, 20b, 20c has a nonvolatile memory device 22a, 22b, 22c, and contains a quantity of ink in an ink reservoir.

Stored in the memory device 22a, 22b, 22c of each printhead cartridge 20a, 20b, 20c is a numerical or alphanumerical printhead identification value, such as a serial number, that uniquely identifies the printhead cartridge 20a, 20b, 20c. Also stored in each memory device 22a, 22b, 22c is a status indicator value that indicates whether or not the printhead cartridge 20a, 20b, 20c has been used before in any printer. For example, the status indicator value may be a single-bit value, with a binary 1 indicating a new state and a binary 0 indicating a used state.

In a preferred embodiment, the memory device 14a, 14b, 14c of each printer 12a, 12b, 12c stores printhead identification values in association with ink dot count values and timestamp values. The printhead identification values identify all printhead cartridges that have ever been installed in the printer, the ink dot count values indicate the number of ink dots fired from each of the identified printhead cartridges while in use in the printer, and the timestamp values indicate the most recent date/time that each printhead cartridge was used in a print job. FIGS. 3A and 3B depict exemplary tabular representations of ink dot count values stored in association printhead identification values and timestamp values in the memories 14b and 14c of the printers 12b and 12c, respectively.

Figure 2:
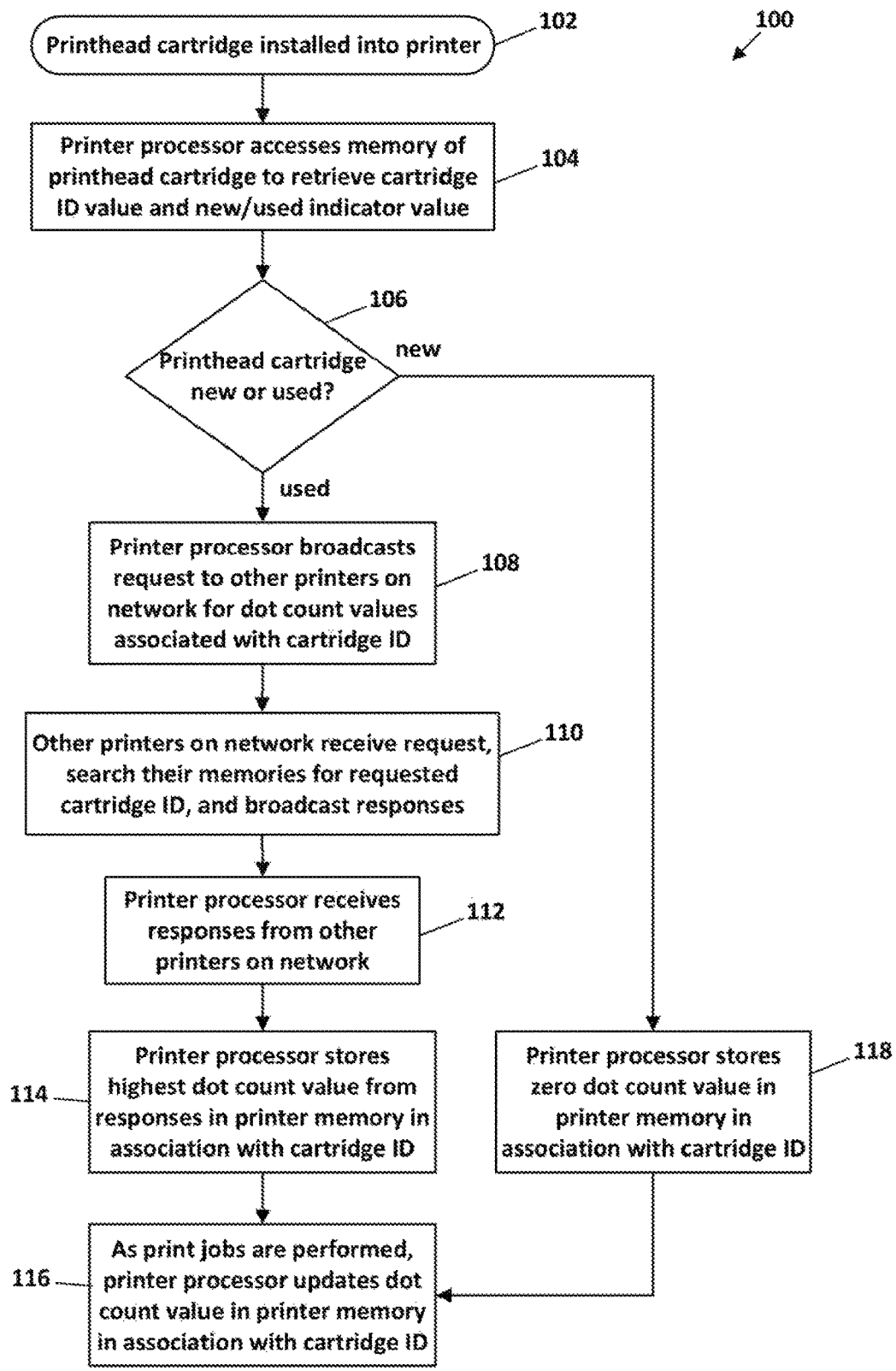
FIG. 2 depicts a method for advertising dot counts of inkjet printhead cartridges to inkjet printers connected to a network according to a preferred embodiment.

FIG. 2 depicts a preferred embodiment of a method 100 for sharing printhead ink dot count values in an ink jet printer system, such as the system 10 depicted in FIG. 1. When a new or used printhead cartridge, such as the cartridge 20a, is installed in a printer, such as the printer 12a (step 102), the processor 16a of the printer accesses the memory 22a of the cartridge and retrieves the printhead identification value and the status indicator value (step 104). For example, the printhead identification value for the cartridge 20a may be "00001" and its status indicator value may be "0" indicating that cartridge 20a has been used before. Based on determining that the cartridge 20a has been used (step 106), the processor 16a broadcasts a request through the network interface 18a to all other printers connected to the network 24 (step 108). The other printers 20b, 20c on the network 24 search their memories 14b, 14c for a printhead identification value that matches the value in the request, and each printer having a matching printhead identification value in its memory broadcasts a response through its network interface 18b, 18c to the network 24 (step 110). Each response includes the ink dot count value that is stored in memory in association with the matching printhead identification value. For example, if the values depicted in FIG. 3A represent values stored in the memory 14b of the printer 12b, the response from printer 12b would include the ink dot count value "12345" associated with the printhead identification value "00001." Similarly, if the values depicted in FIG. 3B represent values stored in the memory 14c of the printer 12c, the response from printer 12c would include the ink dot count value "30103" associated with the printhead identification value "00001."

The processor of the printer 12a receives the responses from the network 24 (step 112), chooses which response is most relevant, which is the response that includes the highest ink dot count value, and stores the highest ink dot count value in the memory 14a in association with the requested printhead identification value (step 114). For example, the ink dot count value "30103" in the response from printer 12c would be stored in the memory 14a because it is greater than the ink dot count value "12345" in the response from printer 12b. Thereafter, as ink dots are fired during operation of the printer 12a using the installed printhead cartridge 20a, the ink dot count value associated with the printhead identification value for the printhead cartridge 20a is incrementally updated in the memory 14a, starting at "30103" (step 116). In alternative embodiments, instead of determining which response includes the highest ink dot count value at step 114, the processor of the printer 12a determines which response includes the most recent timestamp value associated with the reported ink dot count value.

Going back now to step 106, if the status indicator value for the cartridge 20a indicates that the installed cartridge 20a is new (not used) (step 106), the processor of the printer 12a stores an ink dot count value of zero in the memory 14a in association with the printhead identification value (step 118). Thereafter, as ink dots are fired during operation of the printer 12a using the installed printhead cartridge 20a, the ink dot count value associated with the printhead identification value for the printhead cartridge 20a is incrementally updated in the memory 14a from an initial count of zero (step 116).

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for precisely determining an amount of ink that has been expended by a removable inkjet printhead cartridge that is installed in an inkjet printer connected to a network of printers, the method comprising:
storing a printhead identification value in a printhead memory device on the inkjet printhead cartridge;
storing a current ink dot value in the printhead memory device; and
providing a processor in the printer for executing instructions for:
accessing the printhead identification value and ink dot value from the printhead memory device and storing the printhead identification value and the current ink dot count value in a printer memory device;
communicating over the network with one or more other printers connected to the network;
receiving ink dot count values from the one or more other printers connected to the network, wherein the received ink dot count values are associated with a printhead identification value that matches the printhead identification value stored in the printer memory device;
updating the current ink dot count value stored in the printer memory device to be equivalent to a highest ink dot count value of the ink dot count values received from the one or more printers connected to the network; and
as printing is being performed by the inkjet printer, incrementing the current dot count value stored in the printer memory device based on a number of ink dots ejected from the inkjet printhead cartridge.

2. The method of claim 1, further comprising storing a status indicator value in the printhead memory device for indicating a used status or a not-used status of the inkjet printhead cartridge prior to installing the cartridge in the printer.

3. The method of claim 1, further comprising determining a remaining ink level value for the inkjet printhead cartridge based on the ink dot count value stored in the printer memory device.

4. The method of claim 1, further comprising storing a time stamp value associated with the printhead identification value in the printhead memory device.

5. The method of claim 4, further comprising accessing the time stamp value in the printhead memory device to determine the most recent timestamp value; and providing the highest ink dot count value based on the most recent timestamp value for storing in the printer memory device.

6. An inkjet printer attached to a network of printers, comprising;
a network interface for communicating with the network of printers;
a removable inkjet printhead cartridge having a printhead memory device in which a printhead identification value is stored;
a printer memory device for storing the printhead identification value accessed from the printhead memory device and a current ink dot count value;
a processor that executes instructions for
communicating over the network with one or more other printers connected to the network;
receiving ink dot count values from the one or more other printers connected to the network, wherein the received ink dot count values are associated with a printhead identification value that matches the printhead identification value stored in the printer memory device;
updating the current ink dot count value stored in the printer memory device to be equivalent to a highest ink dot count value of the ink dot count values received from the one or more printers connected to the network; and
as printing is being performed by the inkjet printer, incrementing the current dot count value stored in the printer memory device based on a number of ink dots ejected from the inkjet printhead cartridge to provide an updated ink dot count value for the cartridge.

7. The inkjet printer of claim 6, wherein the processor executes instructions to determine a remaining ink level value for the inkjet printhead cartridge based on the current ink dot count value stored in the printer memory device.

8. The printer of claim 6, wherein the processor executes instructions for storing the updated ink dot count value in the printer memory device in association with the printhead identification value.

* * * * *